CRYOELECTRIC LOGIC CIRCUITS
Filed March 27, 1963 3 Sheets-Sheet 1
FIG. 1.
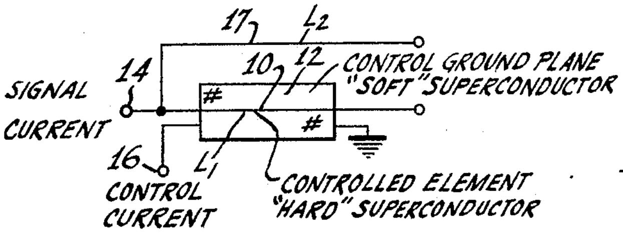
FIG. 2.
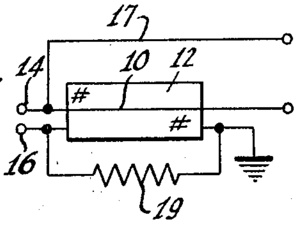
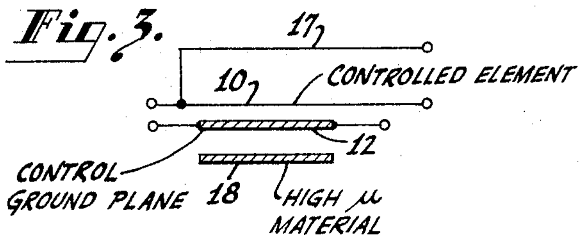
FIG. 3.
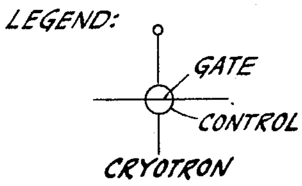
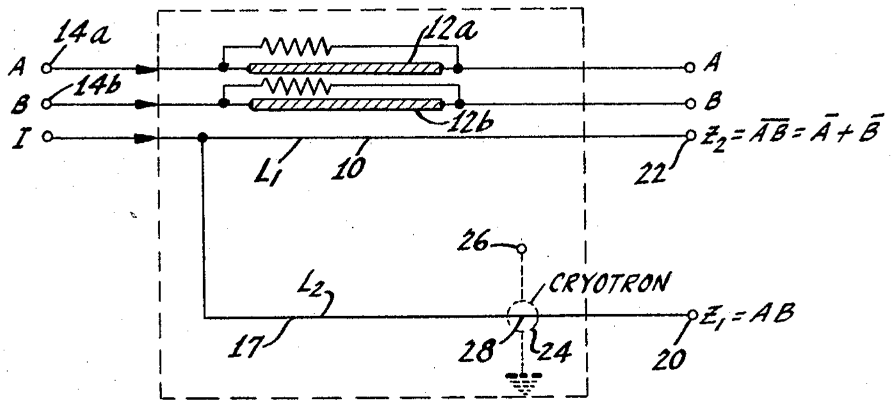
FIG. 4.
INVENTOR.
ROBERT A. GANGE
BY Samuel Cohen
ATTORNEY Aug. 2, 1966 R. A. GANGE 3,264,490

CRYOELECTRIC LOGIC CIRCUITS

Filed March 27, 1963 3 Sheets-Sheet 2

INVENTOR.
ROBERT A. GANGE

BY Samuel Cohen

ATTORNEY

INVENTOR
ROBERT A. GANGE
BY Samuel Cohen
ATTORNEY

United States Patent Office 3,264,490

Patented August 2, 1966

3,264,490

CRYOELECTRIC LOGIC CIRCUITS

Robert A. Gange, Skillman, N.J., assignor to Radio Corporation of America, a corporation of Delaware Filed Mar. 27, 1963, Ser. No. 268,279
7 Claims. (Cl. 307—88.5)

This invention relates to new and improved cryoelectric logic circuits.

The logic circuits of the invention employ devices which are operated at a low temperature such as a few degrees Kelvin. These devices include superconductor control elements and controlled elements located adjacent to the control elements. The inductance of the controlled element depends upon the penetration depth $\lambda$ of the control element. $\lambda$ is a parameter which defines the distance a magnetic field penetrates into or through an element and may be larger than the actual thickness of the element.

More specifically, the logic circuits of the invention include control ground plane means formed of superconductor material. Input means to which signal currents representative of input binary bits may be applied are coupled to the control ground plane means. A pair of parallel connected superconductive current paths are also included in the circuit. One of the paths is located adjacent to the control ground plane means and this path's inductance is a function of $\lambda$ of the control ground plane means whereas the second path is located sufficiently far from the control ground plane means that its inductance is unaffected by the control ground plane means and remains fixed. A current is applied to the parallel connected current paths. An output terminal at one of the current paths provides a signal current indicative of a given logic function of the input binary bits.

The circuits of the invention are capable of performing a number of different logic functions. For example, one of the circuits can simultaneously perform the AND and NAND functions; another can perform the OR and NOR functions.

The invention is discussed in greater detail below and is illustrated in the following drawings of which:

FIGS. 1, 2 and 3 are schematic drawings of prior art "ryotrons";

FIG. 4 is a schematic drawing of an AND-NAND gate according to the invention;

Throughout the drawings similar reference numerals are applied to similar elements.

Figure 5:
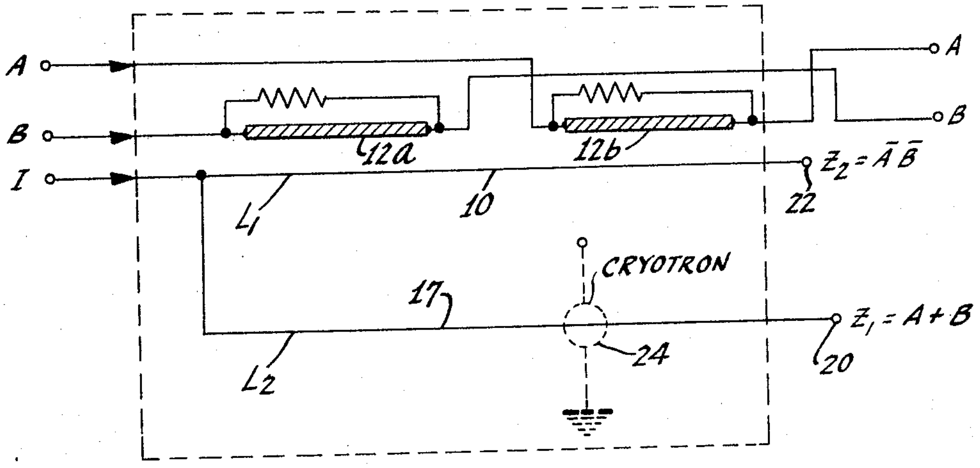
FIG. 5 is a schematic drawing of an OR-NOR gate according to the invention.

The various circuits discussed below are all assumed to be in a low temperature environment such as a few degrees Kelvin.

The device shown schematically in FIG. 1 has been given the coined name "ryotron" (not to be confused with cryotron). The device includes a first (controlled) element 10 which is preferably a superconductor, but which in some cases may instead be a conductor of the non-superconducting type. It is located closely adjacent to, but insulated from, a second superconductor (control) element 12 known as a control ground plane. The element 10 is preferably made of a "hard" superconductor such as lead, whereas the element 12 is made of a "soft" superconductor such as tin. A control current may be applied to input terminal 16 of the control ground plane and a signal current may be applied to input terminal 14 of the controlled element 10. In the absence of the control current applied to terminal 16, the control ground plane 12 is in its superconducting state and acts as a magnetic field shield. Under these conditions, the inductance of element 10 is relatively low. However, when a control current having an amplitude greater than the "critical" current for control ground plane 12 is applied to terminal 16, the control ground plane is driven to its "normal" (resistive) state whereby its penetration depth $\lambda$ increases greatly, and the inductance of element 10 also increases greatly. The increase in inductance may be several orders of magnitude, the exact amount depending upon many factors including the geometry actually employed and so on. Although illustrated as a straight wire, element 10 may include several turns if higher values of inductance are desired. Throughout the operation of the ryotron, the controlled element 10 (when a superconductor such as lead) remains in its superconducting state.

In the use of the ryotron in the circuits of this invention, the controlled element 10 has in shunt therewith a second element 17 sometimes also termed a second current path. Preferably this second element is formed of a hard superconductor such as lead. The second element is located out of the range of control of the ground plane 12. Therefore, the inductance of element 17 remains fixed.

In the operation of the ryotron of FIG. 1, if one assumes that the inductances $L_1$ and $L_2$ of current paths 10 and 17, respectively, are initially of the same value, the signal current applied to input terminal 14 initially divides equally between those two paths. However, when a control current 16 is applied to the control ground plane 12, the control ground plane switches out of its superconducting state and the inductance of controlled element 10 increases very substantially. This causes the input current now to steer mainly into the current path 17 as its inductance is now substantially smaller than that of current path 10. This current steering is based on the principle that in a lossless circuit of two parallel connected current paths (in the present case, both current paths 10 and 17 are assumed to be superconducting and therefore lossless at all times) the current divides between the paths inversely proportionally to the inductance of the two paths.

The illustration of FIG. 1 is schematic. In practice, the control ground plane may be vacuum deposited as a thin film onto a substrate. Thereafter, a thin film of insulator material such as silicon monoxide may be vacuum deposited over the control ground plane. Thereafter, controlled element 10 may be laid down as a thin film conductor also by vacuum deposition. At the same time, the alternate path 17 may also be laid down through the same mask. The order of layer deposition may, of course, be reversed.

For the sake of drawing simplicity the silicon monoxide layer is not shown in FIG. 1 or in the other figures. However, it is to be understood that in each of the figures the element corresponding to 10 is insulated from and is in close proximity to the control ground plane. It is also to be understood that the ryotron may include a second control ground plane on the other side of the controlled element 10. In other words, the ryotron may consist of a controlled element sandwiched between two control ground planes. These two control ground planes may be connected in parallel or in series and both may be connected to the same control current terminal such as 16 so that the control current flows through both control ground planes and drives both out of the superconducting state at the same time.

Switching the element 12 between superconducting and normal states requires a certain amount of power. However, λ, the penetration depth of the control ground plane still increases greatly if, instead of being switched to the normal state, the control ground plane is switched to the intermediate state (between its normal and superconducting states). If a resistance of relatively low value such as $10^{-3}$, $10^{-4}$ ohms is connected across the control ground plane, it permits the latter to be switched to the intermediate state, provided the amplitude of the control current is slightly greater than that of the critical current. FIG. 2 illustrates an embodiment of the invention which is capable of operating in this way. The shunt resistor is shown at 19. The other elements carry the same reference numerals as the corresponding elements of FIG. 1.

In the discussion so far, the maximum inductance assumed for element 10 is its inductance in free space. However, if instead of being in free space, the element 10 is placed close to a second element having a permeability $\mu$, much greater than the permeability of free space (which is equal to 1), the inductance of element 10 will increase greatly over its inductance in free space. In the ryotron of FIG. 3 the element 18 is formed of a material having a $\mu$ which is greater than 1 and is placed on the side of the control ground plane 12 opposite from the current carrying controlled element 10. The material of element 18 may be a ferroelectric material such as iron, permalloy, one of a number of ferrites or the like. A linear material is preferred, that is, one having no or substantially no hysteresis. Many of the ferrite materials and permalloys which exhibit square hysteresis loops at room temperature have very little or no hysteresis in the low temperature environment at which the circuits of the present invention are operated and are therefore suitable.

In the operation of the ryotron of FIG. 3, when the control ground plane is superconducting it acts as a magnetic field shield to the controlled element 10 and the latter's inductance is low. The presence of the high $\mu$ element 18 has substantially no effect. However, when the λ of the control ground plane is increased substantially as, for example, by driving the plane 12 into the normal or intermediate state, the inductance of element 10 increases very greatly.

In the logic circuits of the present invention which are discussed next, the control ground planes are, in some cases, shown as being shunted with resistors such as in the ryotron of FIG. 2. It is to be understood that the high $\mu$ material may also be employed as is shown in FIG. 3. However, for the sake of drawing simplicity, this has been omitted. It is also to be understood that the circuits can be operated without the shunt resistors at some sacrifice in power.

The circuit of FIG. 4 includes two control ground planes 12*a* and 12*b* of the same size located adjacent to and one over another. The controlled element 10 is spaced close to the control ground planes. The planes 12*a* and 12*b* may be located as shown or one on each side of element 10. The second element 17, that is, the shunt current path, is placed sufficiently far from the control ground planes that its inductance $L_2$ remains fixed during the operation of the circuits.

In the operation of the circuit of FIG. 4, the inputs A and B are currents which represent binary bits. It may be assumed for the sake of the present discussion, and this is purely arbitrary, that the presence of a current represents the binary bit 1 and its absence the binary bit 0. The current I, which may be some fixed value of current of an amplitude such that it represents a 1, or may be a current pulse of the same amplitude, which is applied concurrently with the currents A and B, is applied to the parallel current paths 10 and 17. It may be assumed that initially the inductance $L_2$ of path 17 is substantially greater than the inductance $L_1$ of path 10. For example, $L_2$ initially may be 10 times greater than $L_1$. In this case, in the absence of inputs A and B, the current I will divide so that $^{10}/_{11}$ of I flows into path 10 and $^{1}/_{11}$ of I flows into path 17. As a rough approximation, one may say that substantially the entire current flows into path 10 and substantially none of it flows into path 17. If now a current A is applied to input terminal 14*a* and no current is applied to terminal 14*b*, the control ground plane 12*a* is switched from its superconducting to its intermediate state. However, the control ground plane 12*b* remains superconducting so that the inductance $L_1$ of path 10 does not change. Therefore, under these conditions, the current I still flows substantially entirely into the path 10.

Suppose now that the current A is absent and the current B occurs. This corresponds to the binary inputs $A=0$, $B=1$. Under these conditions, control ground plane 12*b* switches to the intermediate state. However, the control ground plane 12*a* remains in the superconducting state. Therefore, the inductance of path $L_1$ is still unaffected and substantially all the current I continues to flow in path 10.

Suppose now that currents A and B are both applied to the circuit. This corresponds to the binary conditions $A=1$, $B=1$. Under these conditions, the control ground planes 12*a* and 12*b* both switch to the intermediate state. This causes the inductance of path 10 to increase very greatly. The amount of increase depends upon the circuit geometry and other parameters, but may easily be between 100 and 1000 times. Under these conditions, $L_1$ is much greater than $L_2$ and the input current steers substantially entirely into path 17. The output $Z_1$ available at output terminal 20 therefore represents the binary bit 1.

From the discussion above, it is clear that the circuit of FIG. 4 produces an output $Z_1$ at terminal 20 which is representative of the AND function and an output $Z_2$ at terminal 22 which is representative of the NAND function. The truth Table I below gives the values of the various binary inputs and outputs under the different operating conditions which are possible.

TABLE I

| A | B | $Z_1$ | $Z_2$ |
|---|---|---|---|
| 0 | 0 | 0 | 1 |
| 0 | 1 | 0 | 1 |
| 1 | 0 | 0 | 1 |
| 1 | 1 | 1 | 0 |

While not essential to the operation of the embodiment of FIG. 4, it may be desirable in some types of operation to employ a cryotron such as shown in dashed line at 24. If, initially, a control current is applied to terminal 26 which leads to the control electrode of the cryotron, then the gate electrode 28 of the cryotron will be driven to the normal state. The gate electrode is in series with the path 17 and this causes the path 17, which is assumed to be superconductive initially, now to exhibit some finite value of resistance. Under these conditions, the input current I will steer substantially entirely into path 10, which path is assumed always to be superconducting. When the input current is removed from the cryotron, the current division between paths 10 and 17 established by the action of the cryotron remains, that is, substantially the entire current continues to flow into path 10 and substantially no current flows into path 17. The current may now be made to redistribute between the paths 10 and 17 by making the control ground planes 12*a* and 12*b* both intermediate as described above. However, when currents A and B are removed, the current I redistributes so that substantially all of it flows into path 10 and none flows into path 17 (the cryotron remains inactive both when currents A and B are applied and removed), since a lossless network always tends to return to its original condition after a disturbance applied to the network is withdrawn.

More specifically, the initial current in path 10 ($L_1$) was I so that the flux which was established during the decay of the current in path 17 is given by $IL_1$. Once the cryotron gate electrode 28 returns to the superconducting state (subsequent to the removal of the current pulse from terminal 26) the system is lossless and the flux established in the system must be conserved. When ground planes 12*a* and 12*b* both assume the intermediate state, $L_1$ greatly increases to a value $L_1' >> L_1$. The current must redistribute so that the components $I_1'$ and $I_2'$ (where $I_1'+I_2'=I$) which now exist respectively in inductors $L_1'$ and $L_2$ obey the following equation:

$$I_1'L_1'-I_2'L_2=IL_1 \quad (1)$$

and since $$I=I_1'+I_2'$$
$$I_2'=(L_1'-L_1/L_2+L_1)I_1' \quad (2)$$

However, since $$L_1'>>L_1 \text{ and } L_2>>L_1$$
$$I_2'=L_1'/L_2(I_1') \quad (3)$$

and since $$L_1'>>L_2,\ I_2'>>I_1'.$$

If currents A and B are now removed, the currents will redistribute so as to again conserve the flux $L_1I$. Thus:

$$I_1L_1-I_2L_2=IL_1 \quad (4)$$

Since $$I=I_1+I_2$$
$$I_1L_1-I_2L_2=I_1L_1+I_2L_2 \quad (5)$$

or $I_2=0$ so that substantially all of I flows in path 10 and none flows in path 17.

While in the embodiment of FIG. 4 only two inputs and two control ground planes are shown, it is to be appreciated that there may be more than two inputs and more than two control ground planes. The same holds for the embodiment of FIG. 5. Similarly, in FIG. 6 there may be more than 2 ryotrons 34 and 36 for the shunt current path 44 and in FIG. 7 there may be more than two cryotrons 34*a* and 36*a* in more than two shunt paths, respectively.

The output currents of the circuit of FIG. 4 are returned through loads to some common reference point such as ground. This is indicated schematically by the ground symbols in FIG. 4. However, for the sake of drawing simplicity, the grounds and loads, although present, are omitted from FIGS. 5–7.

The embodiment of the invention shown in FIG. 5 includes the same number of elements as the one of FIG. 4, but arranged differently. In the embodiment of FIG. 5, the control ground planes 12*a* and 12*b* are placed along side of one another rather than on top of one another so that neither ground plane provides a magnetic field shield with respect to the other ground plane. From the discussion of the operation of FIG. 4, the operation of the circuit of FIG. 5 should be clear. As in the circuit of FIG. 4, the inductance $L_2$ is initially assumed to be 10 times greater than $L_1$. Under these conditions, the current I flows substantially entirely into path 10 and substantially no current I flows in path 17. If now the current A is present or the current B is present, or the currents A and B are present, the inductance of path 10 greatly increases and the input current steers substantially entirely into path 17. The binary outputs produced at the terminals 20 and 22 are representative of the OR and NOR functions, respectively. The truth Table II for the circuit of FIG. 5 appears below.

TABLE II

| A | B | $Z_1=A+B$ | $Z_2=\overline{A+B}=\overline{A}\,\overline{B}$ |
|---|---|---|---|
| 0 | 0 | 0 | 1 |
| 0 | 1 | 1 | 0 |
| 1 | 0 | 1 | 0 |
| 1 | 1 | 1 | 0 |

Figure 6:
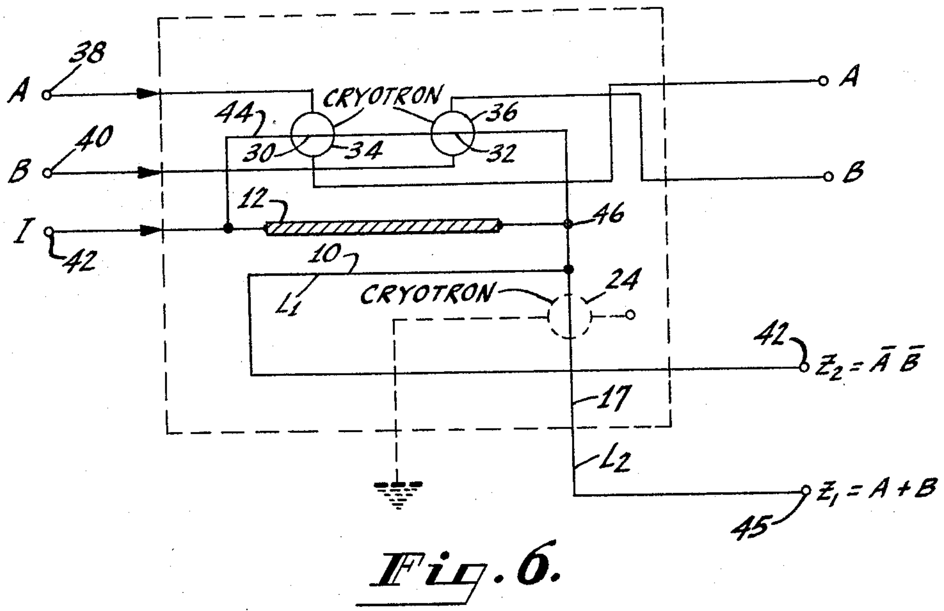
FIG. 6 is a schematic drawing of another embodiment of an OR-NOR gate according to the invention.

Another embodiment of an OR-NOR circuit is shown in FIG. 6. This embodiment includes a control ground plane 12, a controlled element 10 and a second path 17 which is in shunt with the controlled element 10. Paths 10 and 17 are assumed both to be made of a hard superconductor material such as lead. The gate electrodes 30 and 32 of two cryotrons 34 and 36, respectively, are connected in series with each other and in shunt with the control ground plane 12. The control electrodes of the cryotrons 34 and 36 lead to input terminals 38 and 40 to which the signal currents A and B are applied. The control current for the ryotron is applied via terminal 42 to the control ground plane 12.

In the operation of the circuit of FIG. 6 when A and B are 0, that is, when no current is applied either to terminal 38 or 40, the control current 42 divides between the control ground plane 12 and the shunt path 44 for the control ground plane. The inductance of the control ground plane 12 and its shunt path 44 may be assumed to be roughly equal, but this is not essential. What is essential is that the current division be such that the fraction of the input current I which passes through the control ground plane is insufficient to effect a substantial change in λ. Therefore, the inductance of the controlled element 10 remains at its original value $L_1$. If $L_2$ is initially assumed to be say 10 times greater than $L_1$, substantially all of the current I flows through path 10 to output terminal 42 and substantially no current flows through path 17 to terminal 44. In other words, $Z_1=0$ and $Z_2=1$.

Assume now that current is applied to input terminal 38 and no current is applied to terminal 40 ($A=1$, $B=0$). The current applied to terminal 38 causes the gate electrode 30 of the cryotron to become normal. Therefore, the shunt path 44 now is resistive and the input current I steers substantially entirely into the control ground plane 12. The current amplitude is such that the control ground plane is driven from its superconducting to its intermediate state. This causes the inductance $L_1$ of path 10 to increase very greatly. This, in turn, causes the input current I appearing at terminal 46 to steer mainly into path 17 rather than into path 10. Accordingly, the output available at terminal 45 switches to $Z_1=1$ and the output available at terminal 42 switches to $Z_2=0$.

A similar operation occurs when current is applied to input termial 40 and no current is applied to input terminal 38 ($A=0$, $B=1$).

It can readily be seen from the description above that the circuit of FIG. 6 performs the OR and NOR functions. The truth table for these fuctions is Table II above.

Figure 7:
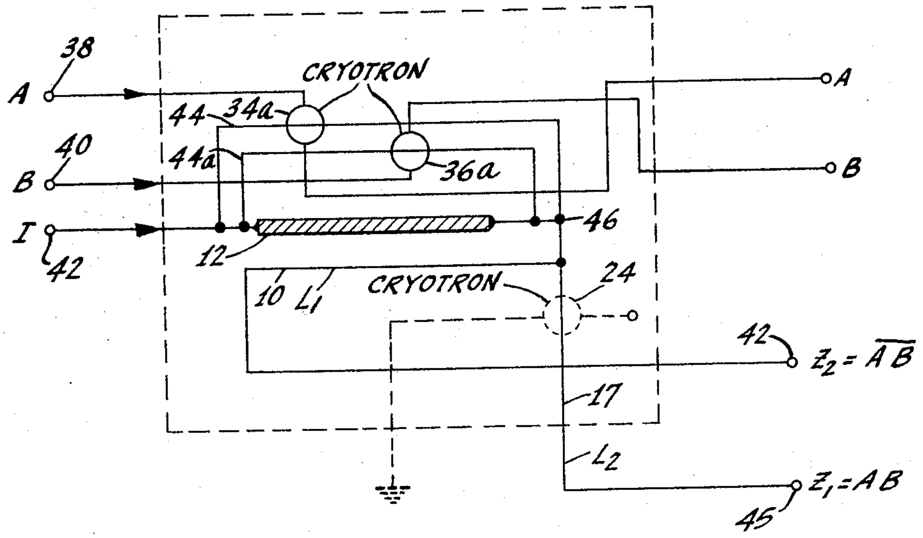
FIG. 7 is a schematic drawing of another embodiment of an AND-NAND gate according to the invention.

The embodiment of the invention shown in FIG. 7 operates on principles somewhat similar to those given in connection with the circuit of FIG. 6. The difference between the circuits of FIG. 6 and FIG. 7 is that in FIG. 7, there are two shunt paths 44 and 44*a* around the control ground plane 12 rather than one. Each of the shunt paths has in series therewith the gate electrode of a single cryotron (cryotrons 34*a* and 36*a*, respectively).

In the operation of the circuit of FIG. 7, if both currents A and B are present, substantially all of the current I flows into the control ground plane and the latter is driven into the intermediate state. $L_1$, which initially is assumed to be $\frac{1}{10}$ $L_2$, now changes its inductance to $L_1'>>L_2$ and I steers mainly into path 17. However, if $A=1$, $B=0$, or if $A=0$, $B=1$, or if $A=0$, $B=0$, a superconducting shunt path 44*a*, or 44, or 44*a* and 44, respectively around the control ground plane continues to exist.

A sufficient fraction of the current I therefore flows into the shunt path or paths that plane 12 remains superconducting with little change in its λ. Therefore, $L_2$, remains much greater than $L_1$ and $Z_1$ is 0.

From the discussion above, it is seen that the circuit of FIG. 7 performs the AND–NAND function, as indicated by the Boolean equations at terminals 42 and 45.

The cryotron 24 shown by dashed lines in FIGS 5, 6 and 7 operates in exactly the same way as the cryotron 24 of FIG. 4. It is not essential to the operation of the circuit of FIGS. 5, 6 and 7. However, it is useful in a number of situations.

Figure 8:
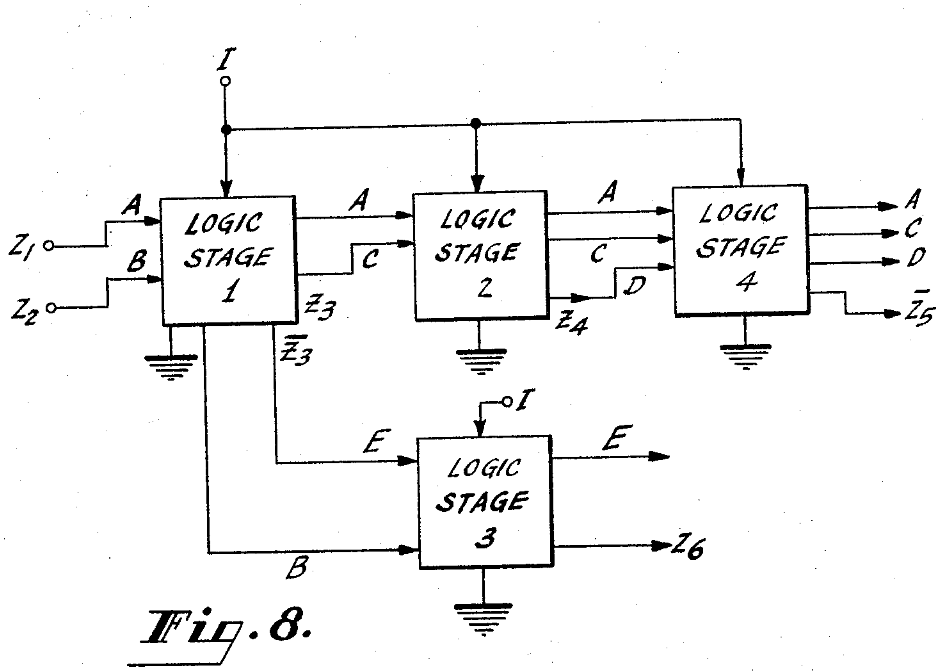
FIG. 8 is a drawing to illustrate the manner in which different logic stages may be interconnected in accordance with the invention.

The block circiut diagram of FIG. 8 illustrates how logic stages of the present invention may be interconnected. The solid blocks of FIG. 8 correspond to the dashed block of FIGS. 4, 5, 6 and 7. No specific logic designations are applied to the individual blocks of FIG. 8, as these will depend upon the problem it is desired to solve. As one typical example, the circuit may include combinations of AND gates and OR gates. Many others are possible and useful.

The circuit of FIG. 8 is included mainly to show the serial fan-out nature of the outputs which are produced. For example, the inputs A and B to logic stage 1 may be the outputs $Z_1$ and $Z_2$ from a previous logic stage. $Z_1$ may fan-out to several additional logic stages, but the fan-out is serial rather than parallel as the parameter employed is current rather than voltage. FIG. 7 shows the serial fan-out of $Z_1$ to three stages, namely, logic stages 1, 2 and 4. The output $Z_3$ produced by the logic stage 1 is shown fanning out serially to two additional stages 2 and 4. The output $\overline{Z}_3$ of stage 1 fans out to logic stage 3 and to the stage following it and so on.

In the various logic stages discussed above, it was assumed, in each case, that $L_2$ is intially 10 times larger than $L_1$. This is not essential. The values chosen for $L_1$ and $L_2$ depend upon assumptions made with respect to the values of current which represent the binary bits 1 and 0, respectively, engineering design considerations, and whether or not the cryotrons such as 24 are to be employed.

In the various circuits discussed above, it is preferred that the currents A, B and I be in the form of concurrently applied pulses rather than direct currents. Further, it is preferred, after a logic function is performed by a network, that any circulating current which remains be destroyed. This may be accomplished, for example, by the cryotrons 24, which may be energized after each logic operation. Alternatively, the polarity of the current pulse I may be changed each succeeding logic operation to destroy any circulating current which may have been established during the previous operation in paths 10 and 17.

What is claimed is:

1. A cryoelectric logic circuit comprising, superconductive control ground plane means;

a plurality of parallel superconductive current paths, at least one located immediately adjacent to the control ground plane means and whose inductance is affected by the state of the control ground plane means and at least one other located sufficiently far from the control ground plane means that its inductance remains fixed and is unaffected by the state of the control ground plane means;

means for applying a current to the parallel current paths;

means coupled to one of the paths for introducing a resistance in one path and thereby establishing a given initial current distribution among the paths;

means coupled to the control ground plane means, to which a plurality of input signal currents representative of input binary bits are applied, for substantially changing the pentration depth λ of the control ground plane means; and output means coupled to at least one of the current paths for providing a signal current indicative of a logic function of the input binary bits.

2. A cryoelectric logic circuit comprising, superconductive control ground plane means;

a pair of parallel superconductive current paths, one located immediately adjacent to the control ground plane means and whose inductance is affected by the state of the control ground plane means and the other located sufficiently far from the control ground plane means that its inductance remains fixed and is unaffected by the state of the control ground plane means;

means for applying a current to the parallel current paths;

a cryotron coupled to one of said paths for introducing resistance into one path and thereby establishing an initial current distribution among said paths;

means coupled to the control ground plane means, to which a plurality of input signal currents representative of input binary bits are applied, for substantially changing the penetration depth λ of the control ground plane means; and output means coupled to at least one of the current paths for providing a signal current indicative of a logic function of the input binary bits.

3. A cryoelectric logic circuit comprising, at least two superconductor control ground planes arranged one over the other;

a pair of superconductor parallel current paths, the first located immediately adjacent to the control ground planes and whose inductance is affected by the states of the control ground planes and the second located sufficiently far from the control ground planes that its inductance remains fixed and is unaffected by the states of the control ground planes;

means for applying a current to the parallel current paths;

means coupled to the control ground planes, to which a plurality of input signal currents representative of input binary bits are applied, for respectively changing the state from superconducting to nonsuperconducting of the control ground planes, whereby when all of the control ground planes change their state, the inductance of said first path greatly increases and the current distribution among the paths changes, whereas when less than all of the control ground planes change their state, the inductance of said first path remains substantially unaffected; and output means coupled to at least one of the current paths for providing a signal current indicative of a logic function of the input binary bits.

4. A cryoelectric logic circuit comprising, superconductive control ground plane means;

a superconductive current path connected in shunt with the control ground plane means;

a pair of superconductive parallel current paths, one located immediately adjacent to the control ground plane means and whose inductance is affected by the state of the control ground plane means and the other located sufficiently far from the control ground plane means that its inductance is unaffected by the state of the control ground plane means, said current paths being connected to receive any current which flows through the control ground planes and its shunt path;

means for applying a current to the control ground plane means and its shunt path;

a plurality of cryotrons, the gate electrodes of which are essentially in series with said shunt current path, to which signal currents representative of input binary bits are respectively applied, for changing the state from superconducting to normal of said shunt path; and output means coupled to at least one of said parallel current paths for providing a signal current indicative of a logic function of the input binary bits.

5. A cryoelectric logic circuit comprising, in combination, a pair of superconductive parallel current paths;

means for aplying a current to the two paths;

means responsive to signals indicative of binary digits for changing the relative inductance of the two paths to cause a redistribution of current between the two paths in accordance with a logic functions of said binary bits; and means responsive to a signal indicative of a binary digit for introducing a resistance into one of said paths to cause a distribution of current between the two paths in accordance with the value of said digit.

6. A cryoelectric logic circuit comprising, superconductive control ground plane means;

a plurality of superconductive current paths connected in shunt with the control ground plane means;

a pair of superconductive parallel current paths, one located immediately adjacent to the control ground plane means and whose inductance is affected by the state of the control ground plane means and the other located sufficiently far from the control ground plane means that its inductance is unaffected by the state of the control ground plane means, said current paths being connected to receive any current which flows through the control ground planes and its shunt path;

means for applying a current to the control ground plane means and its shunt path;

means coupled to said shunt current paths to which a plurality of input signal currents representative of input binary bits are applied for respectively changing the state from superconducting to normal of said shunt paths; and output means coupled to at least one of the parallel current paths for providing a signal current indicative of a logic function of the input binary bits.

7. A cryoelectric logic circuit comprising, superconductive control ground plane means;

a plurality of superconductive current paths connected in shunt with the control ground planes means;

a pair of superconductive parallel current paths, one located immediately adjacent to the control ground plane means and whose inductance is affected by the state of the control ground plane means and the other located sufficiently far from the control ground plane means that its inductance is unaffected by the state of the control ground plane means, said current paths being connected to receive any current which flows through the control ground planes and its shunt path;

means for applying a current to the control ground plane means and its shunt path;

cryotron means respectively coupled to said shunt current paths to which a plurality of input signal currents representative of input binary bits are applied for respectively changing the state from superconducting to normal of said shunt paths; and output means coupled to at least one of the parallel current paths for providing a signal current indicative of a logic function of the input binary bits.

References Cited by the Examiner

UNITED STATES PATENTS

| | | | |
|---|---|---|---|
| 3,171,035 | 2/1965 | Clauser | 307—88.5 |
| 3,184,603 | 5/1965 | Hellerman | 307—88.5 |
| 3,191,063 | 6/1965 | Ahrons | 307—88.5 |
| 3,207,921 | 9/1965 | Ahrons | 307—88.5 |

OTHER REFERENCES

Sanborn, Logical Circuits, IBM Technical Disclosure Bulletin, vol. 3, No. 11, pages 52 and 53, April 1961.

ARTHUR GAUSS, *Primary Examiner.*

I. C. EDELL, *Assistant Examiner.*

JOHN W. HUCKERT, *Examiner.*